Jan. 4, 1938.   H. L. KRAEFT   2,104,346

JUVENILE VEHICLE

Filed Sept. 28, 1936

INVENTOR.

BY Herman L. Kraeft.

Bates, Goldrick & Teare
ATTORNEYS.

Patented Jan. 4, 1938

2,104,346

UNITED STATES PATENT OFFICE 2,104,346

JUVENILE VEHICLE

Herman L. Kraeft, Cleveland Heights, Ohio, assignor to The Murray-Ohio Manufacturing Company, Cleveland, Ohio, a corporation of Ohio Application September 28, 1936, Serial No. 102,833

4 Claims. (Cl. 280—87.5)

This invention relates to a juvenile vehicle construction, and the principal object is to provide a simple and strong supporting arrangement for the main running gear of a dirigible vehicle of the type in which the child rides and which the child propels.

Another object is to provide an improved front wheel and steering mechanism suspension for a juvenile vehicle, adapted to be propelled by the child who rides it.

The invention is shown in combination with an upright plate extending transversely of the vehicle, and which connects the steering mechanism and wheels with the vehicle body structure; the latter, in the form shown, being adapted to be made largely, if not wholly, from sheet metal.

A further object is to provide an improved bracing construction for the forward portion of a juvenile vehicle of the pedal driven type, the body of which vehicle is formed of sheet metal.

Other objects and features of the invention will become apparent from the following description relating to the accompanying drawing, showing the preferred forms. The essential characteristics will be summarized in the claims.

Figure 1:
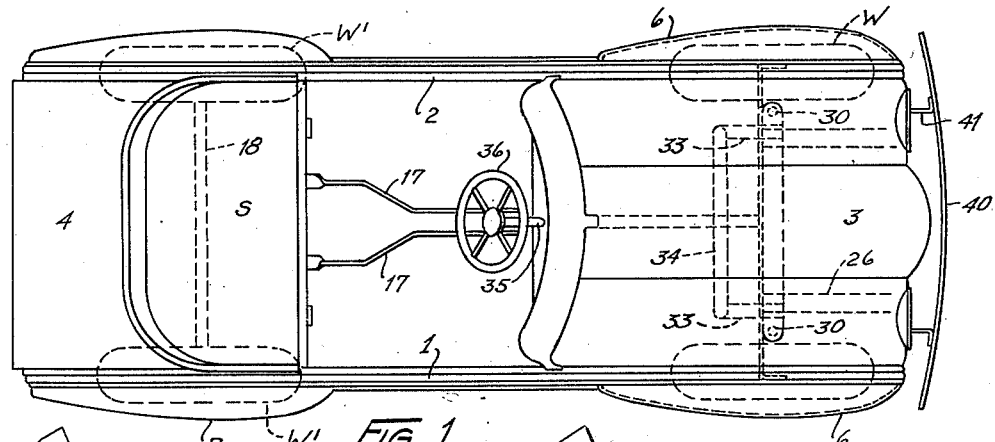
Figures 2, 4:
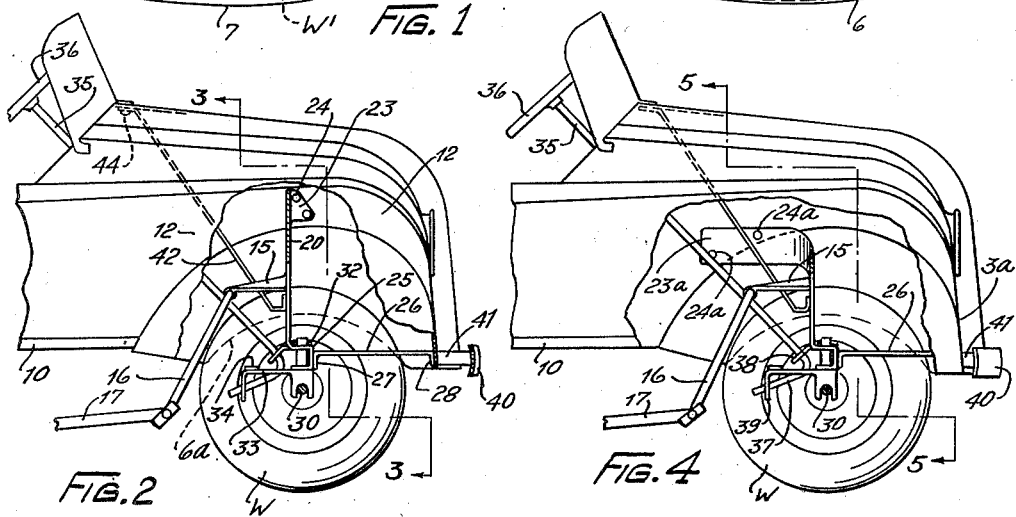
Figures 3, 5:
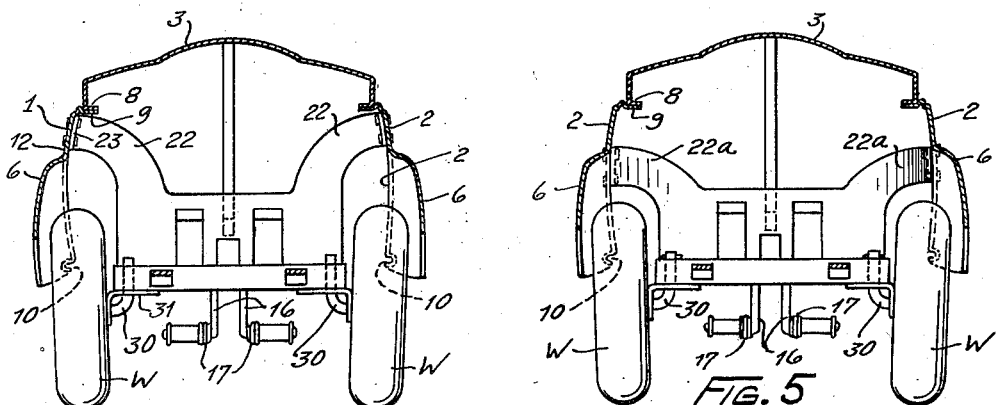

Referring briefly to the drawing, Fig. 1 is a plan view of a juvenile vehicle of the automobile type; Fig. 2 is a fragmentary side elevation of the forward portion of the vehicle, partly broken away to show details of the steering mechanism suspension and cross-brace; Fig. 3 is a transverse sectional view, taken substantially along the lines 3—3 on Fig. 2; Fig. 4 is a view similar to Fig. 2, but showing a modified construction, and Fig. 5 is a sectional view thereof, as indicated by the line 5—5 on Fig. 4.

The body of the vehicle may be substantially as shown in my prior application, Serial No. 9001, filed March 2nd, 1935. This, with the exception of the seat structure, which may be made in any manner, comprises four sheet-metal members, namely, sides 1 and 2, which run the entire length of the vehicle, and connecting forward and rearward hood and deck members 3 and 4, respectively. The hood member 3 extends downwardly as at A to form a radiator front effect, and the forward positions of the side members 1 and 2 are substantially co-extensive with the hood and radiator effects, as shown.

The side members 1 and 2 are provided with outstruck semi-domoidal fender effects 6 and 7, which extend outwardly and downwardly so as partially to conceal the front and rear wheels, i. e. in guarding or shrouding relation thereto. The front fender effects may be extended laterally sufficiently to afford steering clearance for the wheels or they may be arcuately cut away at their lower margins (see dotted line 6a, Fig. 2), to afford proper clearance in accordance with the type of wheels used.

Either the forward or rearward deck or hood members 3 and 4 or both these members may be made integrally with the side members 1 and 2, but the construction shown is one wherein the deck members are made separately and are attached by flanges to the upper marginal portions of the sides. One form of attachment is shown in Figs. 3 and 5, wherein the forward deck member 3 has inwardly turned flanges 8 resting on inwardly turned flanges 9 of the sides, the two overlapping flanges being adapted to be secured together, as by welding or bolting. Both modifications of the improved bracing structures are shown with the same body construction.

It will be noted that the body construction requires no separate sills at the base, due to the peculiar shape of the body members. Intermediately of the hood 3 and the seat structure shown at S, the side members are outwardly bowed in cross-section for lateral and vertical stiffness, as illustrated by broken lines in Figs. 3 and 5. The upper flanges 9 reinforce the top edges of the bowed portions and at the bottom there may be additional bead-like strengthening flanges 10. The body is additionally strengthened by the domoidal fender effects 6 and 7, which are arch-shaped substantially in all vertical and all horizontal planes. Around the fenders 6 (thereabove) are generous substantially planar marginal portions of the sides, indicated at 12.

A vertical cross-plate 20, presently to be described, carries inter alia the forward portion of the pedal drive mechanism comprising a bracket 15 and pedal arms 16 which are connected as by links 17 to crank portions (not shown) of a rear axle 18, on which the rear wheels W1 are mounted.

Referring to Figs. 2 and 3, it will be seen that the front running gear, comprising principally the wheel supports and steering mechanism, is carried on a vertical crossplate 20, the entire shape of which, in front elevation, is shown in Fig. 3. The plate 20 has a generally rectangular central body with upwardly and laterally extending curved arm portions 22 passing around and over the front wheels W with adequate clearance in the event a considerable variation in size of wheels is desired. The outer ends of these curved arms are bent as at 23 to lie substantially parallel to the margins 12; the flanges so formed being rigidly secured to the margins 12 of the side members 1 and 2, as by bolts 24. The detachable connection between the plate 20 and the sides permits the entire running gear unit to be detached from the body, as for separate shipment and storage. In my prior application, above identified, the arms corresponding to 22 are secured to the inside faces of the domoidal fender portions 6. This, however, required in most cases lengthening the arm laterally, weakening them, and decreased the overhead clearance for wheels in the event larger wheels are desired. Moreover, attachment was rendered more difficult than is the case when the end flanges 23 overlie the relatively planar surfaces 12 of the sides.

The upwardly extending arms of the cross plate may be made even shorter when the attachment of the arms to the body sides is effected as shown in Figs. 4 and 5, attention being called to the flanges 23a of the plate 22a, which flanges are turned rearwardly for attachment to the body sides as by bolts 24a, horizontally adjacent the fender effects.

At the bottom of the plate 20 is a channel-shaped formation 25, forming the front axle beam. This may be integral with the main body of the plate 20, or may be made separately from the plate, and secured thereto, as desired. Secured to the channel effect are forwardly reaching struts preferably comprising parallel arms 26 having flanged ends secured as at 27 to the forward face of the channel effect 25, and similar flanges 28 secured to the downwardly turned portion 3a of the hood member 3, so that the hood and plate mutually brace each other in a direction longitudinally of the vehicle.

As a further reinforcement for the front of the body a bumper device 40 may be provided which, as shown, is connected to the depending portion 3a of the hood member substantially in line with the strut members 41. For further bracing of the plate 20 the intermediate or central body portion of it is connected to the hood member 3 by a diagonal strut or tie 42 having a flanged end 43 rigidly secured to the plate 20, the upper end being preferably detachably secured to the hood as by a bolt indicated at 44. This strut cooperates with the strut members 26, in preventing rotation of the lower portion of the plate 20 about its upper anchorages 23 or 23a, as the case may be either forwardly and rearwardly.

The spaced horizontal flange effects of the channel 25 support, in suitable openings, steering knuckles 30 for the wheels W. The pin portions of the knuckles may be secured against dropping out of place by cotter pins 32, Fig. 2. The knuckles have secured thereto angles 31 which extend rearwardly as shown at 33, Fig. 2, to provide steering arms which, in turn, are connected by a tie bar 34.

The steering arrangement further comprises a steering shaft 35, having a wheel 36, the shaft being supported in part on a suitable bracket, (not shown), carried on the upper portion of the hood member 3, and in part by a bracket 38 on the plate 20. The lower end of the shaft is bent rearwardly as at 37 to form an arm lying between the beam effect 25 and the tie bar 33. The connection between the rearwardly extending arm 37 and the tie bar may comprise a bracket 39 which has an enlarged aperture to receive the arm.

I claim:

1. In a juvenile wheeled vehicle of the type having a pair of steering wheels, sheet-metal body sides having outwardly bulged portions adapted to shroud said wheels, and portions marginally adjacent the same which are substantially planar, and a transverse substantially upright plate having flanges connected to the latter portions of the sides in a manner to cross-brace the sides, the connections being disposed closely adjacent the fender bulges, said plate being adapted and arranged to support the wheels and the steering mechanism therefor.

2. In a juvenile vehicle of the class having forwardly disposed steering wheels, a sheet-metal body having depending side portions with outwardly bulged fender effects over the front wheels, and a support for the front wheels comprising a plate connecting the side portions and rigidly secured to substantially vertical portions of the side body members beyond the limits of the fender effects.

3. In a juvenile wheeled vehicle, of the type simulating an automobile and having front steering wheels, said vehicle having a sheet-metal body with side walls and a connecting hood portion having a downwardly extending apron at the front, the combination of a transverse substantially upright plate connected to the side members in a region generally above the wheels, the end portions of which plate support the wheels, a bracing member extending from the plate below its points of connection with the sides and connected with the apron portion of the body, and another bracing member extending upwardly from the plate and connected with the hood portion rearwardly of the plane of the plate.

4. In a juvenile wheeled vehicle, of the type having front steering wheels, a sheet-metal body having side walls and a hood having a downwardly extending apron at the front, a transverse substantially upright plate connected to the side members in a region generally above the wheels, the bottom portion of which plate is formed to provide a support for the wheels, and a strut extending from a point below the plane of the connections of the plate with the sides diagonally upwardly within the hood and connected with an upper portion of the hood to brace the plate.

HERMAN L. KRAEFT.